United States Patent [19]
D'Alterio

[11] Patent Number: 6,148,718
[45] Date of Patent: Nov. 21, 2000

[54] APPARATUS FOR BONDING FOOD PARTICLES

[75] Inventor: Joseph C. D'Alterio, Glen Cove, N.Y.

[73] Assignee: SBJR Restaurants Inc., River Vale, N.J.

[21] Appl. No.: 09/394,516

[22] Filed: Sep. 13, 1999

Related U.S. Application Data

[62] Division of application No. 09/161,638, Sep. 28, 1998, Pat. No. 6,004,602.

[51] Int. Cl.⁷ .............................. A47J 37/00; A23L 1/00; A22C 7/00
[52] U.S. Cl. ................................ 99/349; 99/353; 99/373; 99/377; 99/380
[58] Field of Search .................. 99/349, 353, 372, 99/374, 375, 376, 377, 380, 373; 100/229 R, 320

[56] References Cited

U.S. PATENT DOCUMENTS

| 1,214,486 | 1/1917 | Wright | 99/376 |
| 2,070,706 | 2/1937 | Benson | 99/374 |
| 3,223,025 | 12/1965 | Johns | 99/377 |
| 5,253,565 | 10/1993 | Burton | 99/380 X |

*Primary Examiner*—Reginald L. Alexander
*Attorney, Agent, or Firm*—Paul W. Garbo

[57] ABSTRACT

Apparatus for forming and baking food particles into a unified, shaped product, e.g., shaped like pizza, has heated top and bottom plates, the mating faces of which have recesses and protrusions for molding the desired shaped product. The bottom plate is in two parts that are abutted together when food particles are deposited thereon and during a baking period with the top plate placed thereon. After raising the top plate, the two bottom parts are moved apart to release the baked, shaped product. Cooked pasta, such as spaghetti, can be formed into a pizza-like shell.

20 Claims, 4 Drawing Sheets

APPARATUS FOR BONDING FOOD PARTICLES

This is a division of application Ser. No. 09/6161,638 filed Sep. 28, 1998, now U.S. Pat. No. 6,004,602.

BACKGROUND OF THE INVENTION

This invention relates to apparatus and method for compacting food particles into a unified edible product. More particularly, the invention involves the formation of shaped edible products by binding pieces of food together with pressure and heat.

Illustrative of an edible product composed of pieces of food bonded together is the pasta-based product of U.S. Pat. No. 5,411,752 to Taylor et al. The patent discloses the formation of discrete pieces of cooked pasta with a binding composition into a desired shape. The pasta-based product is proposed as the base or shell of a pizza and as such may be garnished with tomato sauce, cheese, mushrooms, etc. U.S. Pat. No. 4,693,900 to Molinari also describes a shaped pasta product formed of cooked pasta. Zukerman discloses in U.S. Pat. Nos. 3,711,295; 3,961,087 and 5,137,745 shaped food products composed of rice and other cereal grains.

The prior art, however, fails to teach a simple apparatus and method for forming shaped products composed of food particles.

Accordingly, a principal object of this invention is to provide an apparatus and method suitable for commercial production of shaped products composed of food particles.

Another object is to provide an apparatus that compresses and bakes food particles into a unified, shaped product.

A further object is to provide apparatus that minimizes manual labor.

These and other features and advantages of the invention will be apparent from the description which follows.

SUMMARY OF THE INVENTION

In accordance with this invention, an apparatus for forming a shaped product composed of food particles comprises a heated top metal plate and a heated, two-part bottom metal plate, the two parts of which can be alternately moved together and apart. A desired amount of food particles deposited on the bottom plate when the two parts thereof are abutted together can be compressed and baked by applying the heated top plate thereon. Following a selected heating period, the top plate is lifted and the two parts of the bottom plate are separated to release a unified, shaped food product.

The top and bottom plates may be flat to form a pancake-type product but preferably the opposed faces of the top and bottom plates are patterned so that the food particles compressed and baked therebetween will form a three-dimensional product varying in shape from a disk with a turned-up rim to pans or bowls of various configurations. Instead of bowl-like edible products, the invention can form products shaped like hamburgers, frankfurters, croquettes, etc. While the bottom plate will have a hollow or depression and the top plate will have a bulge or protrusion to form a pan or bowl-shaped product, both the bottom and top plates will have hollows or depressions to form a product shaped like a meat ball or bun. For conciseness, a plate having any protrusion will hereinafter be said to have a convex face, while a plate with any depression will hereinafter be said to have a concave face.

Because the products of the invention are formed between heated plates, the term "waffle-type product" will be used hereinafter for conciseness even though the product will not be made of a batter or have the characteristic indentations of popular waffles.

While the apparatus of the invention can be operated manually, its commercial usefulness is maximized by having the top and bottom plates mechanically moved by a timing device so that sequentially the top plate is brought against the bottom plate with its two parts abutted together, then the top plate is removed from the bottom plate and the two parts of the bottom plate are separated and again abutted together, thus readying the apparatus for the next cycle of movements. The timing device can also control dispensing means for depositing a measured amount of food particles on the bottom plate at the start of the cycle before the top plate is brought against the bottom plate.

Manual placement of a measured amount of food particles on the bottom plate at the start of the cycle of movements of both plates is rarely justified because of various common devices that are designed to deliver particulate matter on a timed basis. Extruders and screw pumps are examples of devices used to deliver particulate matter.

The top and bottom plates, preferably made of aluminum, may be heated by steam or other heating fluid or even by combustion of fuel gas, but electrical heating is in most cases preferred. Besides the simplicity of electrical heating elements that can be attached to the top and bottom plates, there is the advantage of simple temperature control.

As for the many types of food particles that can be converted into unified, shaped products, the aforementioned U.S. Patents specify some common examples. To begin with, the term "particle" as used herein is intended to embrace discrete matter ranging in size from about a grain of rice to a pasta shape such as ziti. Such particles may be adapted for cohering in the apparatus of the invention by the addition of a binding agent such as egg white used in the aforementioned Taylor et al patent with cooked pasta. The aforementioned patents to Zukerman illustrate that food particles such as cereal grains can be pretreated in hot water or steam to develop sticky surfaces and thus adapt these cereal grains for use in the apparatus of this invention.

BRIEF DESCRIPTION OF THE DRAWINGS

For further clarification of the invention, the ensuing description will refer to the appended drawings of which.

DESCRIPTION OF PREFERRED EMBODIMENTS

Figure 1:
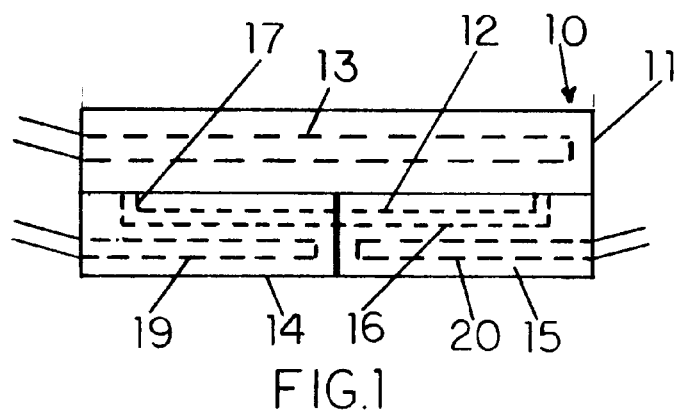
FIG. 1 is a diagrammatic lateral representation of the basic elements of the apparatus of the invention positioned during the baking period.
Figure 2:
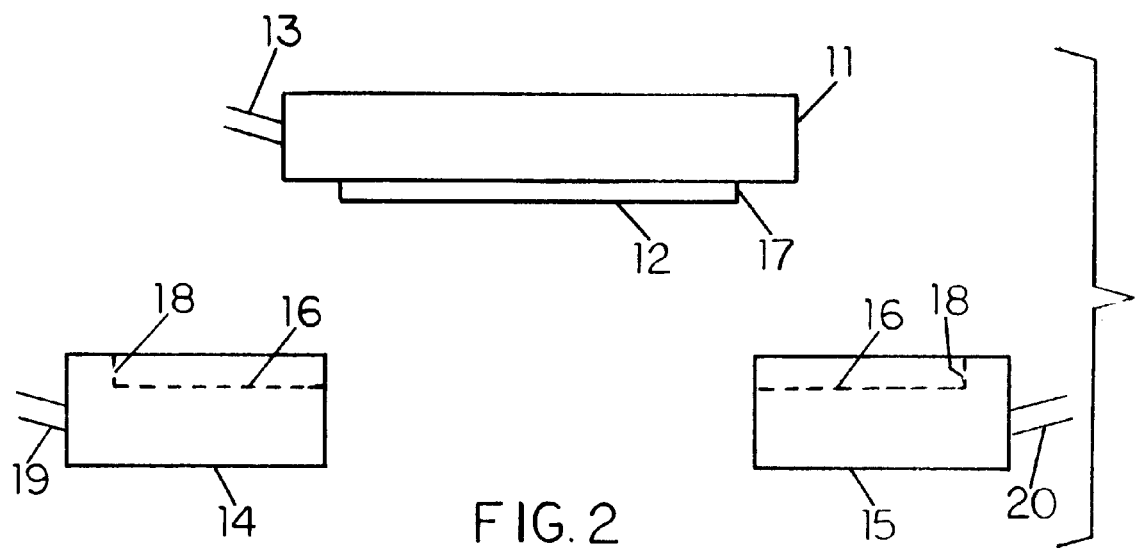
FIG. 2 is a similar representation of the basic elements of FIG. 1 at the end of the baking period when the baked product is discharged.

FIG. 1 and FIG. 2 show the basic elements of the apparatus 10 in their closed and open positions, respectively.

Top plate 11 has a protrusion 12 and contains electrical heater 13. Two parts 14, 15 that form the bottom plate of apparatus 10 have a recess 16 that is deeper than the height of protrusion 12; the dimensional difference corresponds to the thickness of the shaped food product formed between top plate 11 and two bottom plate parts 14,15. Likewise, periphery 17 of protrusion 12 is smaller than periphery 18 of recess 16 by an amount corresponding to the desired thickness of a turned-up rim on the shaped food product formed by the apparatus. Parts 14,15 are provided with electrical heaters 19, 20, respectively.

With an appropriate amount of food articles adapted for cohesion having been placed on bottom parts 14,15 abutted together, FIG. 1 shows top plate 11 positioned to compress and bake the particles into a unified, shaped product. FIG. 2 shows top plate 11 and bottom parts 14,15 as separated to drop the resulting shaped product at that end of the baking period.

In a simple embodiment of the invention, the surfaces of protrusion 12 and recess 16 are flat and peripheries 17,18 are cylindrical so that the shape of the product formed therebetween is a circular disk with a turned-up rim. Such shaped product formed of cooked pasta can be garnished with tomato sauce that will be retained by the rim, of course, peripheries 17,18 can be made square, oval or any other shape. Likewise, the surfaces of protrusion 12 and recess 16 can be lightly corrugated or otherwise contoured to provide a desired surface pattern in the shaped food product.

Figure 3:
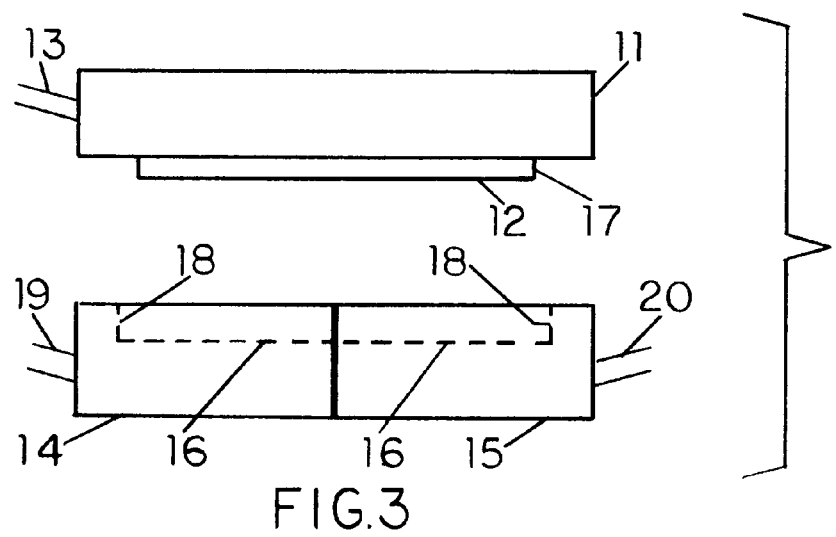
FIG. 3 is a further diagram of the basic elements of FIG. 1, positioned to receive a measured amount of food particles from a supply container.

FIG. 3 differs from FIG. 2 in that bottom plate parts 14,15 have been reunited to permit the deposition of food particles in recess 16. As soon as the food particles have been deposited in recess 16, top plate 11 is brought down and pressed against united bottom plate parts 14,15, as shown in FIG. 1 to bake another unified product.

Top plate 11 and bottom plate parts 14,15 are usually formed from thick aluminum stock and electrical heaters are attached thereto along the sides opposite the sides that come together for the molding and baking period. Preferably, the thick aluminum plate 11 and plate parts 14,15 are drilled or milled to provide cavities into which the electrical heating elements fit. All exterior portions of heated plate 11 and heated plate parts 14,15 should be covered with insulation to reduce heat losses and prevent injury to personnel involved with the operation of the apparatus of the invention.

Depending on the type of food particles to be molded and baked into a shaped product, some may tend to stick to the metal parts. In many cases, a Teflon coating on the metal parts will overcome the sticking problem. Chromium plating may be another way of eliminating sticking.

Food compositions deposited on abutted plate parts 14,15 which contain moisture and other volatile components require the release of the volatiles particularly at the beginning of the molding and baking period. Release of volatiles is simply accomplished by permitting top plate 11 to pop up slightly for an instant. A few successive pop-ups of the top plate will usually eliminate the development of any troublesome gas pressure during the baking period.

Figure 4:
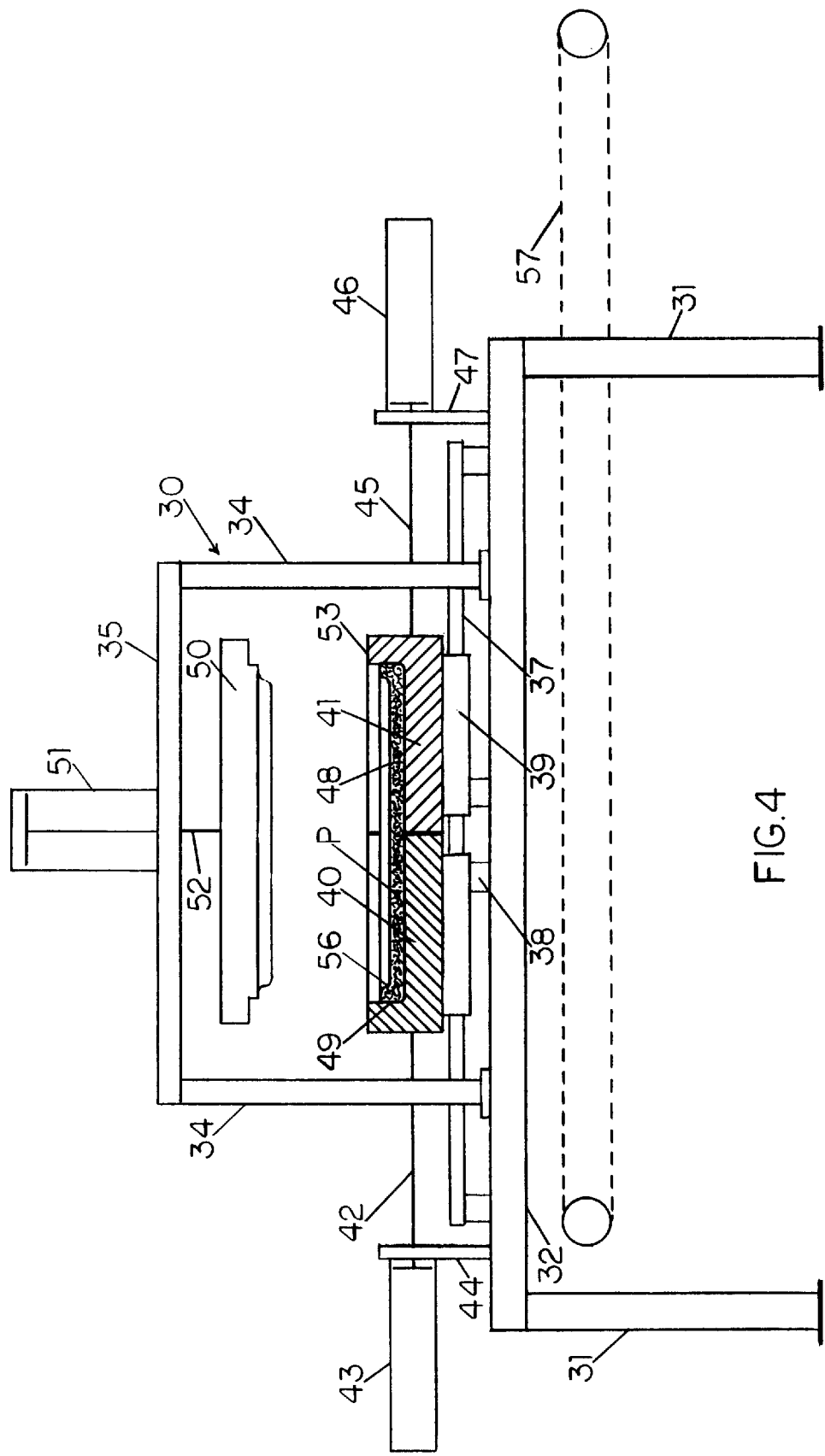
FIG. 4 is a side elevation of an apparatus embodying the three elements of FIGS. 1–3 together with mechanical means for moving the elements.
Figure 5:
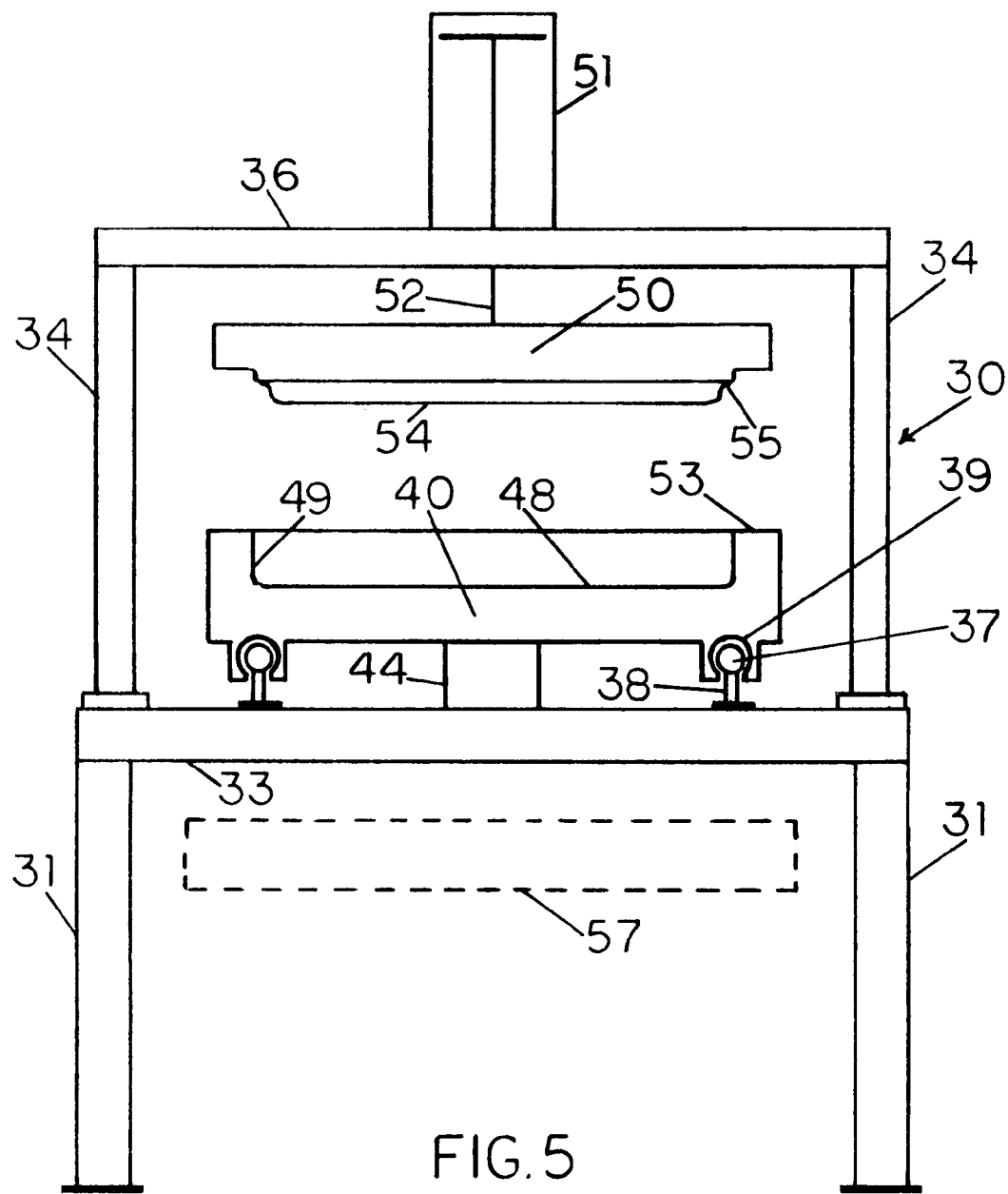
FIG. 5 is a right end elevation of the apparatus of FIG. 4.
Figure 6:
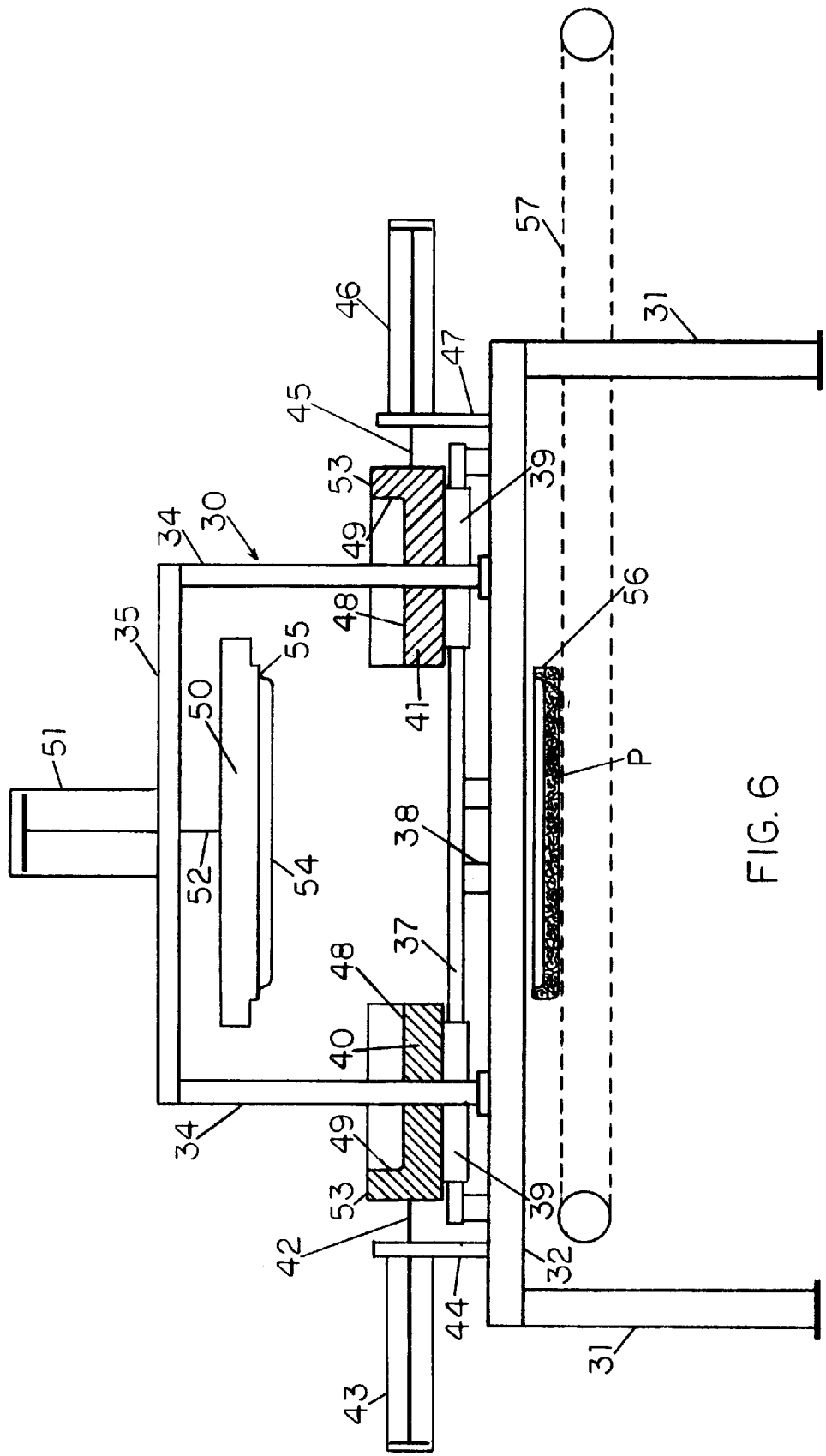
FIG. 6 is a side elevation like FIG. 4 showing the elements in different positions.

FIGS. 4–6 show the three basic elements of the invention together with a preferred type of mechanical devices to move the elements. A simple apparatus 30 has a support frame, formed of angle iron or metal tubing, which comprises four legs 31, two side members 32, two end members 33, four uprights 34, two top side members 35, and two top end members 36. Members 32,33 form a rectangular frame supported at its corners by legs 31. Similarly, members 35,36 from a smaller frame supported at its four corners by uprights 34 which are attached to side members 32.

A pair of tubular rails 37 with pedestals 38 are supported by the frame of members 32,33 and are parallel to members 32. A pair of Teflon slide bearings 39 partially encircle each tubular rail 37 as seen in FIG. 5. For simplicity, bottom plate part 41, rod 45, cylinder 46 and bracket 47 have been omitted in FIG. 5.

The two parts 40,41 of the bottom plate are each attached to two slide bearings 39, one on each of parallel rails 37. Bottom plate part 40 is connected by rod 42 to pneumatic cylinder 43 fastened to bracket 44 which is mounted on the frame of members 32,33. Bottom plate part 41 is similarly connected by rod 45 to pneumatic cylinder 46 fastened to bracket 47 which is also mounted on the frame of members 32,33. As shown in FIG. 4, bottom plate parts 40,41, shown in cross section in FIGS. 4 and 6, have been pushed together by their respective cylinders 43,46. At this point in the description, abutted parts 40,41 should be visualized as being without the shaped food product P.

While bottom plate parts 40,41 are pressed together by opposed pneumatic cylinders 43,46, a measured quantity of food particles is dropped on the circular recess 48 in united parts 40,41. Recess 48 has a shallow cylindrical surface 49. Top plate 50 is now pushed down by pneumatic cylinder 51 and connecting rod 52 against the peripheral band 53 of bottom parts 40,41. Cylinder 51 is supported by the top frame of members 35,36. The bottom side of top plate 50 has a cylindrical protrusion 54 with a periphery 55 that is slightly less than periphery 49 of recess 48 in bottom part 40,41. Protrusion 54 can extend into recess 48 only partly so that a narrow space remains between protrusion 50 and recess 48; this space together with the space between cylindrical wall 49 and contoured periphery 55 provides the mold hollow in which the food particles are compressed into the shaped product P, i.e., a circular shell with a rolled up rim 56. Each of plates 40,41,50 are provided with electrical heating elements that are not shown in describing the mechanical movement of these plates.

After a chosen baking period, top plate 50 is pulled up away from bottom plate parts 40,41 by cylinder 51 to expose the circular product P as shown in FIG. 1. Thereupon, bottom plate parts 40,41 are pulled apart by cylinders 43,46 and connecting rods 42,45 as seen in FIG. 6, with the result that circular shell product P drops, e.g., on conveyor 57. Cylinders 43,45 now drive bottom plate parts 40,43 together so that a measured quantity of food particles can be deposited in recess 48 to repeat the sequential movements of top plate 50 and bottom plate parts 40,41 that lead to the formation of shell product P.

Variations and modifications of the invention will be apparent to those skilled in the art without departing from the spirit or scope of the invention. For example, bottom plate parts 40,41 can have two cavities or recesses 48, side by side, into each of which is deposited a measured quantity of food particles. After compression by top plate 50 and a desired baking period, the separation of parts 40,41 will cause two shaped food products to drop out. Also, two or more pneumatic cylinders may be used to move each of bottom parts 40,41 and top plate 50. Accordingly, only such limitations should be imposed on the invention as are set forth in the appended claims.

What is claimed is:

1. An apparatus for compressing and baking food particles into an edible unified product, which comprises a heated, split bottom plate in two side-by-side parts that can alternately be abutted and separated, and a heated top plate that can alternately be pressed against, and removed from, said bottom plate when said two parts are abutted.

2. The apparatus of claim 1 wherein the two parts of the bottom plate have a recess and the top plate has a protrusion to form the unified product in the shape of a shallow pan.

3. The apparatus of claim 1 wherein the two parts of the bottom plate have a recess and the top plate has a recess to form the unified product in the shape of a bun or hamburger.

4. The apparatus of claim 1 wherein the two parts of the bottom plate are alternately pushed together and pulled apart by pneumatic cylinders, and the top plate is alternately pushed against, and raised from, the bottom plate by a pneumatic cylinder.

5. The apparatus of claim 2 wherein the two parts of the bottom plate are alternately pushed together and pulled apart by pneumatic cylinders, the top plate is alternately pushed against, and raised from, said bottom plate by a pneumatic cylinder, all of said pneumatic cylinders are sequentially activated by a timing device.

6. The apparatus of claim 4 wherein the bottom plate has a recess, the top plate has a protrusion that extends into the upper portion of said recess when said top plate is pushed against said bottom plate, and all of the pneumatic cylinders are sequentially activated by a timing device.

7. The apparatus of claim 6 wherein the top plate and the; two parts of the bottom plate are made of aluminum and have electric heaters attached thereto.

8. An apparatus for forming and baking food particles into an edible shaped product, which comprises a heated top plate, a heated, two-part bottom plate, first moving means for alternately moving the two parts of said bottom plate together and apart, and second moving means for alternately moving said top plate down on said bottom plate when said two parts are together to compress and bake food particles placed thereon and after a selected baking period up from said bottom plate, said first moving means being operative to move said two parts apart to drop said shaped product.

9. The apparatus of claim 8 wherein the two-part bottom plate has a recess corresponding to the desired shaped product to be formed therein.

10. The apparatus of claim 9 wherein the top plate has a protrusion with a periphery smaller than the periphery of the recess in the two-part bottom plate to form the shaped product with a turned-up rim.

11. The apparatus of claim 8 wherein each of the top plate and the two parts of the bottom plate has an electrical heater attached thereto.

12. The apparatus of claim 10 wherein each of the top plate and the two parts of the bottom plate has an electrical heater attached thereto.

13. The apparatus of claim 8 wherein the first and second moving means are pneumatic cylinders.

14. The apparatus of claim 12 wherein the first and second moving means are pneumatic cylinders.

15. The apparatus of claim 8 wherein the first moving means and the second moving means are controlled by a timing device to provide desired sequential movements.

16. The apparatus of claim 14 wherein the first moving means and the second moving means are controlled by a timing device to provide desired sequential movements.

17. An apparatus for compressing and baking food particles into a unified product, which comprises a heated top plate, a heated bottom plate in two parts, pneumatic cylinders connected to said two parts for alternately moving said two parts together and apart, a pneumatic cylinder connected to said top plate for alternately moving said top plate against, and away from, said bottom plate when the two parts thereof are together, and a timing device to activate said pneumatic cylinders to provide desired sequential movements of said two parts and said top plate.

18. The apparatus of claim 17 wherein the bottom plate has a cavity and the top plate has a protrusion that extends into the upper portion of said cavity when said top plate is pushed against said bottom plate.

19. The apparatus of claim 18 wherein the cavity of the bottom plate is cylindrical and the protrusion of the top plate is shaped to form the unified product in the shape of a shallow pan.

20. The apparatus of claim 18 wherein the top plate and the two parts of the bottom plate are made of aluminum and have electric heaters attached thereto.

\* \* \* \* \*